(12) United States Patent
Shin et al.

(10) Patent No.: US 9,547,189 B2
(45) Date of Patent: Jan. 17, 2017

(54) LIQUID CRYSTAL DISPLAY DEVICE

(71) Applicant: LG DISPLAY CO., LTD., Seoul (KR)

(72) Inventors: Jung-Hoon Shin, Chungcheongnam-do (KR); Chan-Heon Lee, Daegu (KR); Min-Ji Kim, Ulsan (KR)

(73) Assignee: LG DISPLAY CO., LTD, Seoul (KR)

( * ) Notice: Subject to any disclaimer, the term of this patent is extended or adjusted under 35 U.S.C. 154(b) by 321 days.

(21) Appl. No.: 14/143,288

(22) Filed: Dec. 30, 2013

(65) Prior Publication Data

US 2015/0062479 A1 Mar. 5, 2015

(30) Foreign Application Priority Data

Aug. 30, 2013 (KR) ........................ 10-2013-0103709

(51) Int. Cl.
*G02F 1/1333* (2006.01)
*G02F 1/1345* (2006.01)

(52) U.S. Cl.
CPC ..... *G02F 1/133308* (2013.01); *G02F 1/13452* (2013.01); *G02F 2001/133334* (2013.01)

(58) Field of Classification Search
CPC ............ G02F 1/133308; G02F 1/13452; G02F 2001/13334
See application file for complete search history.

(56) References Cited

U.S. PATENT DOCUMENTS

| | | | | |
|---|---|---|---|---|
| 5,164,542 A | * | 11/1992 | Hart | G06F 1/1626 174/383 |
| 5,264,992 A | * | 11/1993 | Hogdahl | G06F 1/1626 16/334 |
| 5,329,427 A | * | 7/1994 | Hogdahl | G06F 1/16 361/728 |
| 5,579,487 A | * | 11/1996 | Meyerson | G06F 1/1626 361/679.41 |
| 6,661,399 B1 | * | 12/2003 | Oh | G02F 1/13338 345/174 |
| 7,324,093 B1 | * | 1/2008 | Gettemy | G06F 1/1622 178/18.01 |
| 2002/0051102 A1 | * | 5/2002 | Kuroki | G02F 1/133308 349/58 |
| 2006/0044286 A1 | * | 3/2006 | Kohlhaas | G02F 1/13338 345/173 |
| 2008/0218655 A1 | * | 9/2008 | Won | G02F 1/133308 349/58 |
| 2008/0278653 A1 | | 11/2008 | Chung et al. | |
| 2010/0156841 A1 | * | 6/2010 | Wang | G06F 3/0414 345/174 |

(Continued)

FOREIGN PATENT DOCUMENTS

CN 101303482 A 11/2008
JP 10-222305 A 8/1998

(Continued)

*Primary Examiner* — Ryan Crockett
(74) *Attorney, Agent, or Firm* — Birch, Stewart, Kolasch & Birch, LLP

(57) ABSTRACT

A liquid crystal display device includes a liquid crystal module; a printed circuit board providing driving signals to the liquid crystal module; and an installation unit including first, second and third parts, wherein the first part is attached to the liquid crystal module, the second part faces the first part and is attached to the printed circuit board, and the third part connects the first and second parts.

12 Claims, 4 Drawing Sheets

(56) References Cited

U.S. PATENT DOCUMENTS

2012/0068936 A1* 3/2012 Kim .................. G06F 3/021
  345/169
2013/0164479 A1* 6/2013 Lo ..................... B32B 3/06
  428/53

FOREIGN PATENT DOCUMENTS

| JP | 2000-347594 A | 12/2000 |
| JP | 2006-163742 A | 6/2006 |
| JP | 2006-277739 A | 10/2006 |

* cited by examiner

LIQUID CRYSTAL DISPLAY DEVICE

The application claims the benefit of Korean Patent Application No. 10-2013-0103709 filed in Korea on Aug. 30, 2013, which is hereby incorporated by reference for all purposes as if fully set forth herein.

BACKGROUND

Field of the Disclosure

The disclosure relates to a liquid crystal display device, and more particularly, to a liquid crystal display device in which a digitizer is detachable.

Discussion of the Related Art

Liquid crystal display (LCD) devices are most widely used for monitors of notebook computers, monitors of personal computers and televisions due to low power consumption, thin thickness and large screen. LCD devices use the optical anisotropy and polarization properties of liquid crystal molecules of a liquid crystal layer to produce an image.

An LCD device includes two substrates spaced apart from and facing each other and a liquid crystal layer interposed between the two substrates. The alignment direction of the liquid crystal molecules is controlled by varying the intensity of an electric field applied to the liquid crystal layer, and the transmittance of light through the liquid crystal layer is changed.

The LCD devices require an additional light source because the LCD devices are not self-luminescent. Therefore, a backlight unit is disposed at a rear side of a liquid crystal (LC) panel and emits light into the LC panel, whereby discernible images can be displayed.

Backlight units are in general classified as edge type or direct type according to the position of a light source with respect to a display panel. In an edge-type backlight unit, a light source is disposed at one side or at each of two sides of a light guide plate of a backlight unit and light from the light source is reflected by the light guide plate or a reflection plate to be provided to the display panel. In a direct-type backlight unit, a plurality of light sources such as lamps is disposed directly under the display panel. The direct-type backlight unit has been widely used for LCD devices having a large screen of more than 20 inches because it does not require a light guide plate, has high utilization rate of light, is simply handled, and is not limited in a screen size.

The LC panel and the backlight unit are modularized with various mechanical components to be protected from outer impacts and to prevent light loss.

Meanwhile, a digitizer may be used as an input device of an LCD device. The digitizer recognizes (X,Y) coordinate of a display device and detects a specific content or key value.

Accordingly, a user can easily input desired values using an electromagnetic pen or probe.

Hereinafter, an LCD device including a digitizer as an input device according to the related art will be described with reference to FIG. 1.

FIG. 1 is a cross-sectional view of illustrating an LCD device according to the related art.

In FIG. 1, the related art LCD device includes a cover bottom 28, a backlight unit 30, a liquid crystal panel 10, a digitizer 40, a guide panel 13, and a case top 15. The digitizer 40 is disposed between the backlight unit 30 and the liquid crystal panel 10.

The cover bottom 28 encloses the liquid crystal panel 10 and the guide panel 13.

The backlight unit 30 provides light to the liquid crystal panel 10 and includes a light guide plate 24, a reflection sheet 26, optical sheets 22 and a lamp assembly 27. The lamp assembly 27 includes a lamp housing 27a and LED lamps 27b.

In the meantime, liquid crystal cells are arranged in an active matrix form between upper and lower substrates of the liquid crystal panel 10. Transmittance of the liquid crystal cells is changed according to a video signal, and an image corresponding to the video signal is displayed.

A printed circuit board 11 is connected to the lower substrate of the liquid crystal panel 10 along at least an edge of the lower substrate via a connecting means 12. The printed circuit board 11 may be bent toward a side surface of the guide panel 13 or a rear surface of the cover bottom 28.

The case top 15 encloses sides and edges of the liquid crystal panel 10, the guide panel 13 and the cover bottom 28 and is combined with the cover bottom 28 to form a liquid crystal module.

In the liquid crystal module, since the printed circuit board 11 is bent toward the side surface of the guide panel 13 or the rear surface of the cover bottom 28, a bezel are of the LCD device may be decreased.

In the meantime, the digitizer 40 includes a sensor which detects the location indicated by the electromagnetic pen or probe.

At this time, the digitizer 40 detects external electromagnetic changes. Since electromagnetic fields penetrate the liquid crystal panel 10, digitizer 40 is able to recognize movements of the electromagnetic pen over the liquid crystal panel 10 even if the digitizer 40 is disposed under the liquid crystal panel 10.

By the way, when the digitizer 40 is installed at a rear surface of the liquid crystal module, the digitizer 40 may malfunction because the digitizer 40 is affected by interference of electromagnetic waves generated from the printed circuit board 11.

However, the digitizer 40 is installed to the liquid crystal module, and the LCD device is released. Since the manufacturer needs to buy the digitizer 40, to install the digitizer 40 to the liquid crystal module, and to release the LCD device including the digitizer 40, the manufacturing costs increase. On the other hand, there is a problem that the user cannot decide whether or not the digitizer 40 is installed.

SUMMARY

Accordingly, the present invention is directed to a liquid crystal display device that substantially obviates one or more of the problems due to limitations and disadvantages of the related art.

An advantage of the present invention is to provide a liquid crystal display device which has a narrow bezel area and in which a digitizer is detachable.

To achieve these and other advantages and in accordance with the purpose of embodiments of the invention, as embodied and broadly described, a liquid crystal display device includes a liquid crystal module; a printed circuit board providing driving signals to the liquid crystal module; and an installation unit including first, second and third parts, wherein the first part is attached to the liquid crystal module, the second part faces the first part and is attached to the printed circuit board, and the third part connects the first and second parts. A digitizer is installed between the first and second parts and is detachable.

It is to be understood that both the foregoing general description and the following detailed description are exemplary and explanatory and are intended to provide further explanation of the invention as claimed.

DETAILED DESCRIPTION OF THE PREFERRED EMBODIMENTS

Reference will now be made in detail to embodiments of the present invention, an example of which is illustrated in the accompanying drawings.

Figure 1:
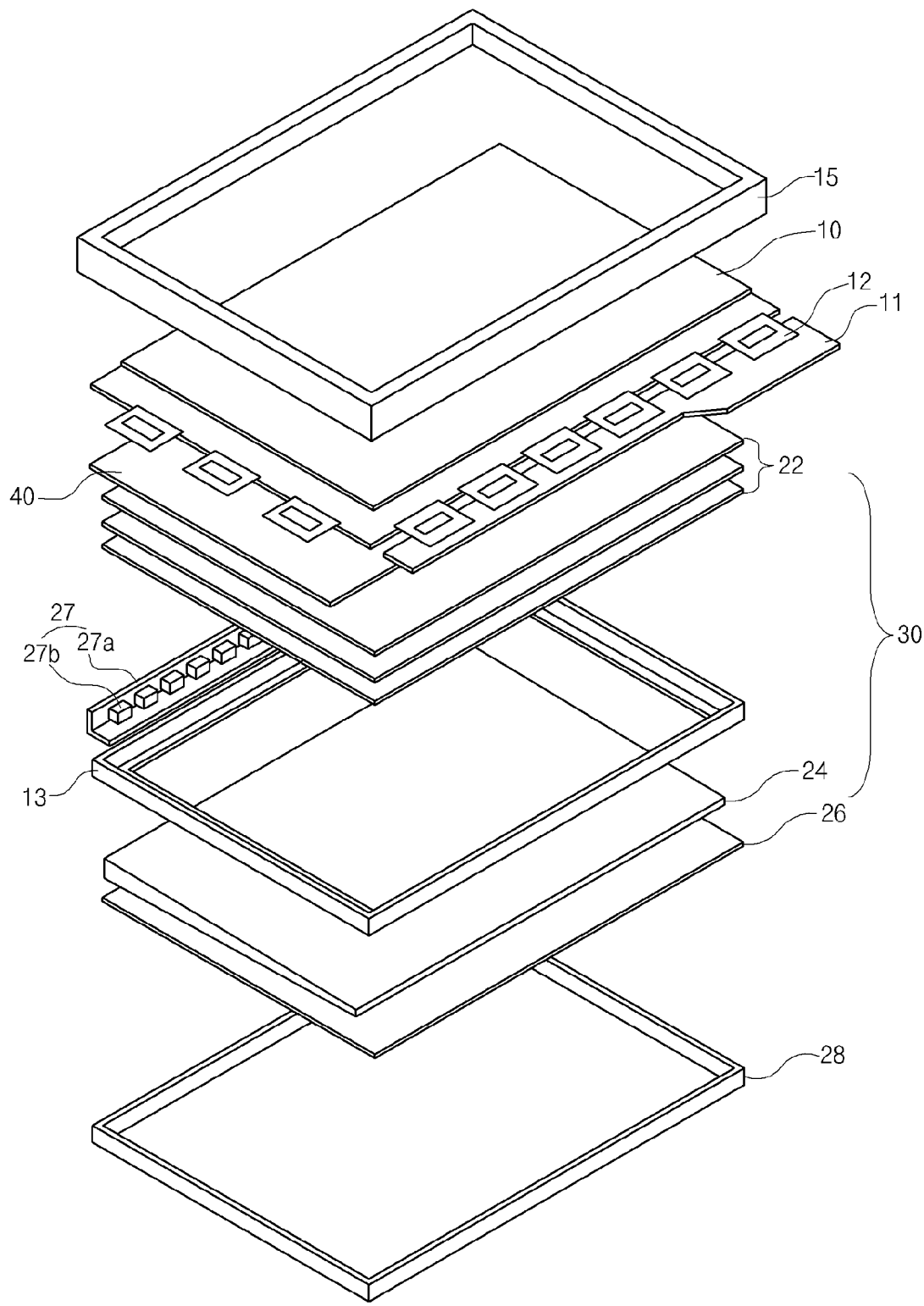
FIG. 1 is a cross-sectional view of illustrating an LCD device according to the related art.
Figure 2:
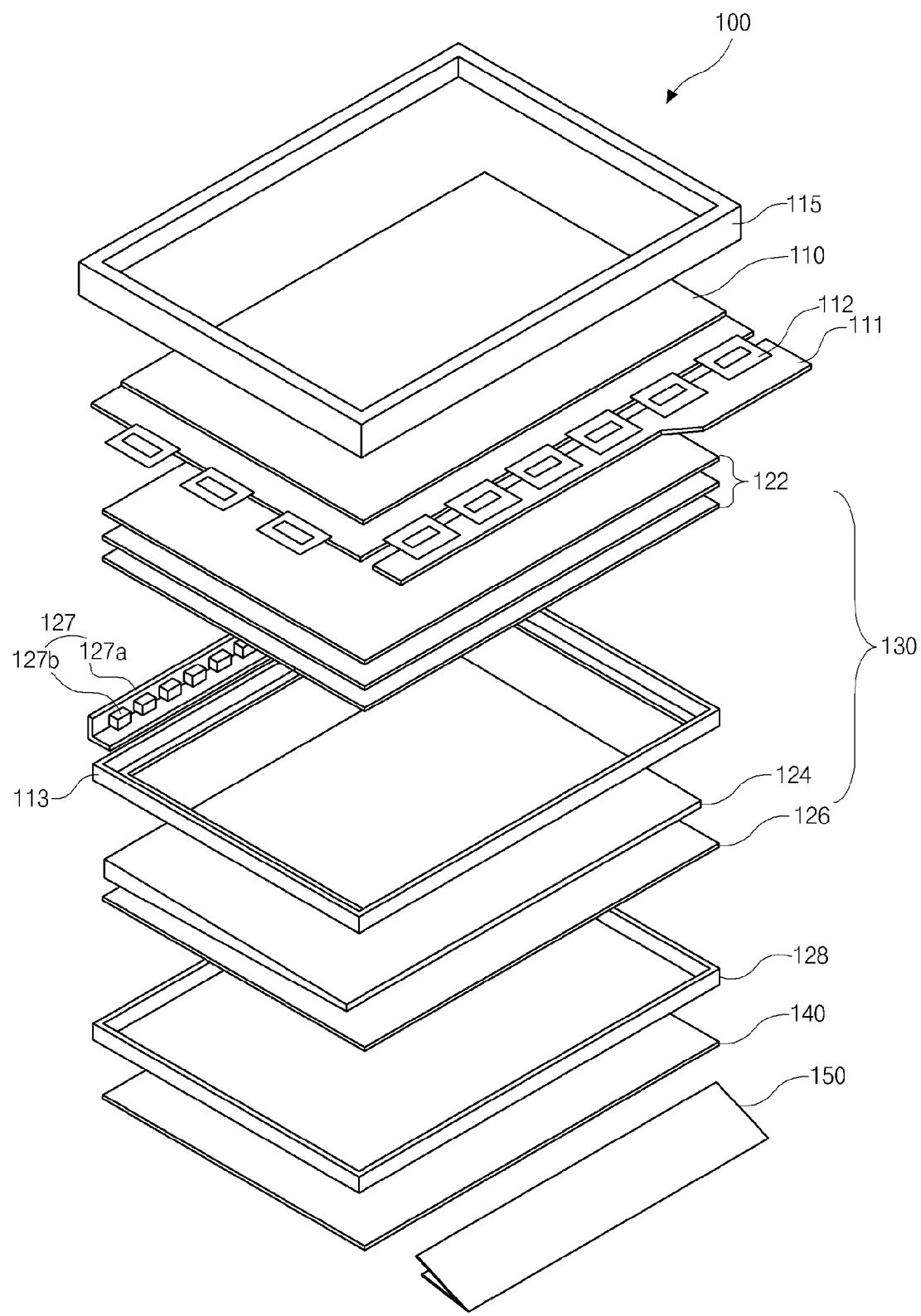
FIG. 2 is an exploded perspective view of an LCD device according to an embodiment of the present invention.

FIG. 2 is an exploded perspective view of an LCD device according to an embodiment of the present invention.

In FIG. 2, an LCD device according to the embodiment of the present invention includes a cover bottom 128, a backlight unit 130 and a liquid crystal panel 110 sequentially disposed inside the cover bottom 128, a guide panel 113 disposed between the backlight unit 130 and the liquid crystal panel 110 to support the liquid crystal panel 110 and combined with sides of the cover bottom 128, a case top 115 fixing the guide panel 113 and the liquid crystal panel 110, an installation unit 150, and a digitizer 140.

The cover bottom 128 is formed of a metal having relatively high heat conductivity such that heat from the inside of the device is effectively discharged, and the cover bottom 128 encloses the liquid crystal panel 110 and the guide panel 113.

The backlight unit 130 includes a light guide plate 124, a reflection sheet 126, optical sheets 122 and a lamp assembly 127. The lamp assembly 127 includes a lamp housing 127a, which may be a printed circuit board, and LED lamps 127b as a light source.

The lamp assembly 127 is disposed at a side surface of the light guide plate 124. A lamp assembly may be disposed at each of opposite side surfaces of the light guide plate 124. The light guide plate 124 changes paths of light emitted from the LED lamps 127b toward the liquid crystal panel 110 and also changes a linear light source into a surface light source. The reflection sheet 126 reflects light passing through a rear surface of the light guide plate toward the liquid crystal panel 110.

The optical sheets 122, which may include a diffuser sheet and a prism sheet, are disposed over the light guide plate 124. The optical sheets 122 improve uniformity of the surface light source from the light guide plate 124.

In the meantime, liquid crystal cells are arranged in an active matrix form between upper and lower substrates of the liquid crystal panel 110.

Gate lines and data lines crossing each other to define pixel regions are formed on the lower substrate, and a thin film transistor is formed at each pixel region. A liquid crystal capacitor is connected to the thin film transistor.

Transmittance of the liquid crystal cells is changed according to a video signal, and an image corresponding to the video signal is displayed.

The liquid crystal panel 110 is divided into a display area displaying the image and a non-display area surrounding the display area.

A printed circuit board 111 is connected to the lower substrate of the liquid crystal panel 110 along at least an edge of the lower substrate via a connecting means 112 such as a flexible printed circuit or a tape carrier package. The printed circuit board 111 may be bent toward a side surface of the guide panel 113 or a rear surface of the cover bottom 128 and may be attached to the installation unit 150 in a modularizing step, which is disposed at a rear surface of a liquid crystal module 100.

Drive integrated circuits for driving the thin film transistors of the LCD device may be mounted on the printed circuit board 111. The liquid crystal panel 110 and the printed circuit board 111 are electrically connected to each other through the connecting means 112, and control signals and the video signal from the printed circuit board 111 are applied to the liquid crystal panel 110.

The case top 115 has a rectangular frame shape including a plane portion and a side portion, which are perpendicularly connected to each other. The case top 115 encloses sides and edges of the liquid crystal panel 110, the guide panel 113 and the cover bottom 128 to form the liquid crystal module 100.

In the liquid crystal module 100, the printed circuit board 111 is appropriately bent to the installation unit 150, thereby decreasing a bezel area of the LCD device.

The installation unit 150 attached to the rear surface of the liquid crystal module 100 functions as a hinge such that the printed circuit board 111 is swung while being fixed to the liquid crystal module 100. The installation unit 150 includes two parts, one ends of which are touched to each other to form a space therebetween. The digitizer 140 is installed in the space between the two parts of the installation unit 150.

Figure 3:
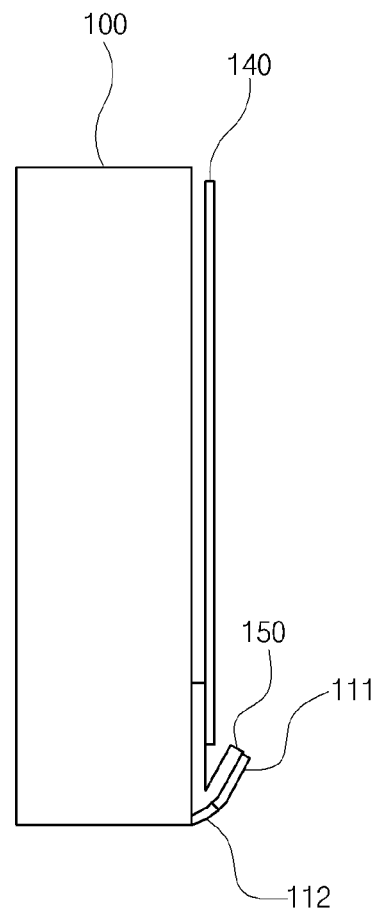
FIG. 3 is a cross-sectional view of schematically illustrating an LCD device according to the embodiment of the present invention.

FIG. 3 is a cross-sectional view of schematically illustrating an LCD device according to the embodiment of the present invention.

In FIG. 3, the LCD device according to the embodiment of the present invention includes a liquid crystal module 100, a printed circuit board 111, a connecting means 112, an installation unit 150, and a digitizer 140. The printed circuit board 111 provides driving signals to the liquid crystal module 100, and the connecting means electrically connects the liquid crystal module 100 and the printed circuit board 111. The installation unit 150 is disposed between the liquid crystal module 100 and the printed circuit board 111 and functions as a hinge such that the printed circuit board 111 is fixed to the liquid crystal module 100 while being swung. The digitizer 140 is installed at the installation unit 150.

Although not shown in the figure, a lot of elements including integrated circuits are mounted on the printed circuit board 111. The printed circuit board 111 is electrically connected to a liquid crystal panel (not shown) of the liquid crystal module 100, and driving signals from the printed circuit board 111 are provided to the liquid crystal panel to produce an image.

The digitizer 140 is electrically connected to the printed circuit board 111. The digitizer 140 may be classified into resistive type, capacitive type, and electromagnetic type according to different methods of detecting a touch input of a user.

A resistive type digitizer detects a location pushed by pressure according to current amount change while a direct current voltage is applied. A capacitive type digitizer detects a selected location using capacitance coupling while an alternating current voltage is applied. An electromagnetic type digitizer detects a selected location according to voltage change while a magnetic field is applied.

Although not shown in the figure, when the digitizer 140 is an electromagnetic induction type, a plurality of coils in the digitizer 140 may detect electromagnetic change, and the digitizer 140 can figure out a location of an electronic pen. Therefore, even though the digitizer 140 is disposed under the liquid crystal module 100, electromagnetic fields pass through the liquid crystal module 100 over the digitizer 140, and the digitizer 140 is able to recognize movement and location of the electronic pen.

That is, since the digitizer 140 recognizes (X,Y) coordinate of the LCD device and detects a specific content or key value, a user is able to easily input desired values using an electromagnetic pen, which may be referred to as an electronic pen or a digital pen, or probe.

The installation unit 150 is closely disposed to the rear surface of the liquid crystal module 100 when the digitizer 140 is not installed and is split to form a space for the digitizer 140 when the digitizer 140 is installed.

Hereinafter, the installation unit 150 will be described in more detail with reference to FIG. 4.

Figure 4:
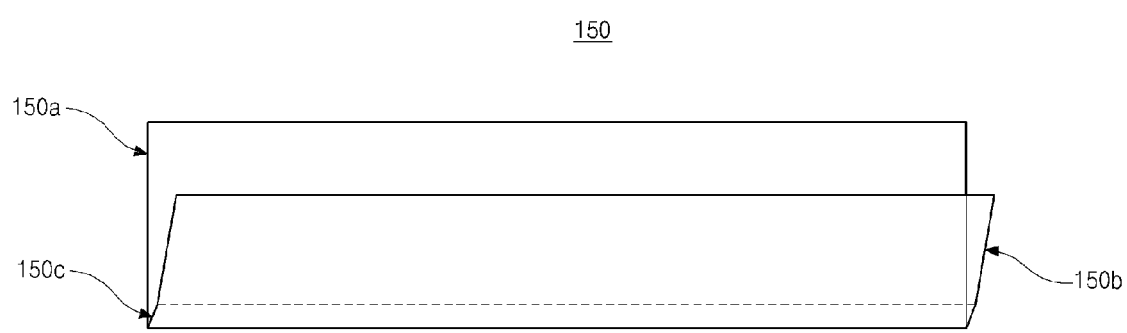
FIG. 4 is a perspective view of schematically illustrating an installation unit of an LCD device according to the embodiment of the present invention.

FIG. 4 is a perspective view of schematically illustrating an installation unit of an LCD device according to the embodiment of the present invention.

In FIG. 4, the installation unit 150 is flexible and partially bent back to have a V-like shape or a U-like shape.

The installation unit 150, for example, includes a material selected from polyethersulfone (PES), polycarbonate (PC), polyimide (PI), polyethylene terephthalate (PET), polyethylene naphthalate (PEN), poly acrylate (PAR) and fiber reinforced plastic (FRP).

The installation unit 150 includes a first part 150a attached to the liquid crystal module 100 of FIG. 3, a second part 150b facing the first part 150a and attached to the printed circuit board 111 of FIG. 3, and a third part 150c connecting the first part 150a and the second part 150b.

The digitizer 140 of FIG. 3 is installed between the first, second and third parts 150a, 150b and 150c.

More particularly, when the digitizer 140 of FIG. 3 is not installed, facing surfaces of the first and second parts 150a and 150b completely contact each other, and a thickness of the LCD device is decreased. When the digitizer 140 of FIG. 3 is installed, the first and second parts 150a and 150b are spaced apart from each other to form a space therebetween, and the digitizer 140 of FIG. 3 is disposed between the first and second parts 150a and 150b. The digitizer 140 of FIG. 3 may be installed on the first part 150a.

Meanwhile, a double-sided tape may be attached at outer surfaces of the first part 150a and 150b such that the liquid crystal module 100 of FIG. 3 is attached to the first part 150a and the printed circuit board 111 of FIG. 3 is attached to the second part 150b.

Figure 5:
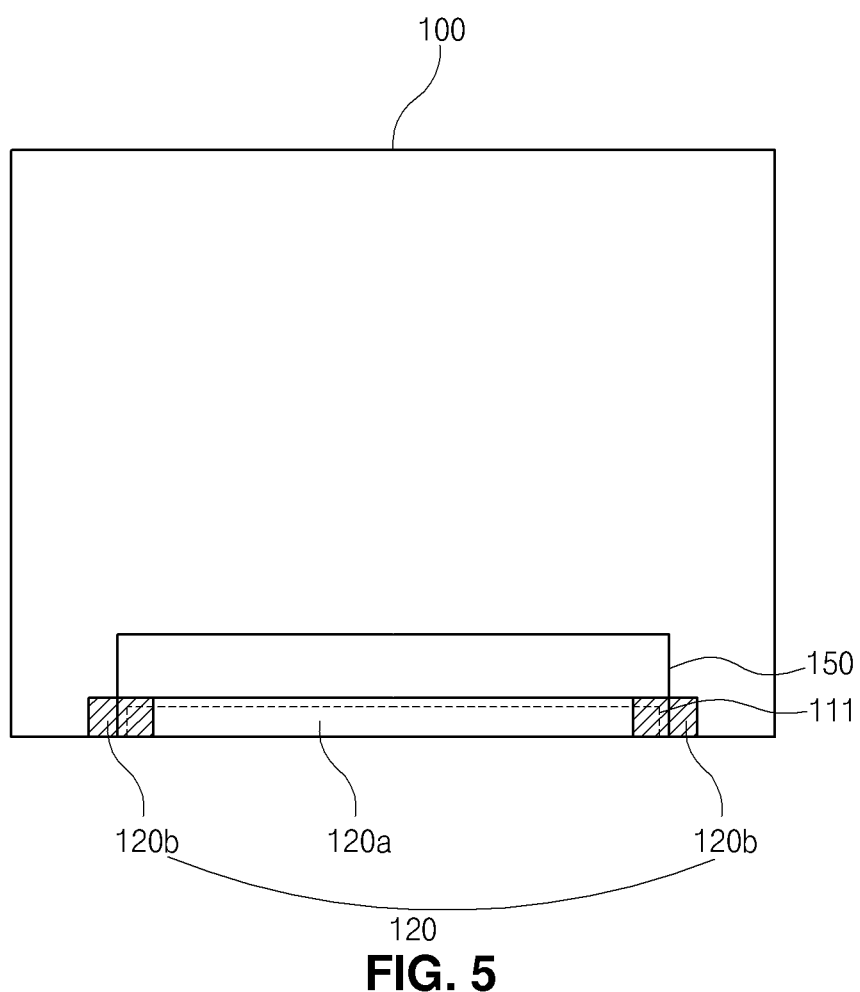
FIG. 5 is a plan view of schematically illustrating a rear side of an LCD device according to the embodiment of the present invention.

At this time, to protect the integrated circuits mounted on the printed circuit board 111 of FIG. 3, which is stuck to the outer surface of the second part 150, a cover shield 120 of FIG. 5 is attached to an outer surface of the printed circuit board 111 of FIG. 3. The printed circuit board 111 of FIG. 3 may be grounded to the liquid crystal module 100 of FIG. 3.

FIG. 5 is a plan view of schematically illustrating a rear side of an LCD device according to the embodiment of the present invention.

In FIG. 5, the LCD device of the present invention includes the liquid crystal module 100, the installation unit 150 having one surface attached to the rear surface of the liquid crystal module 100, the printed circuit board 111 attached to another surface of the installation unit 150, and the cover shield 120 covering a surface of the printed circuit board 111 to protect the integrated circuits of the printed circuit board 111.

At this time, in the related art LCD device, the printed circuit board is grounded to the cover bottom of the liquid crystal module. However, in the LCD device according to the embodiment of the present invention, it is difficult that the printed circuit board 111 is grounded to the liquid crystal module 100 because the installation unit 150 is disposed between the printed circuit board 111 and the liquid crystal module 100.

To solve the problem, the cover shield 120 is divided into first and second cover shield sides 120a and 120b. An insulating tape is attached to the first cover shield side 120a facing an area where the integrated circuits of the printed circuit board 111 are mounted. A conductive tape is attached to the second cover shield side 120b both ends of the first cover shield side 120a.

Here, the cover shield 120 is also attached to the cover bottom 128 of FIG. 2. That is, the conductive tape attached to the second cover shield side 120b contacts the cover bottom 128 of FIG. 2, and the printed circuit board 111 is grounded to the cover bottom 128 of FIG. 2.

Accordingly, even though the installation unit 150 is equipped to the rear surface of the liquid crystal module 100, the printed circuit board 111 is grounded to the liquid crystal module 100, and the printed circuit board 111 normally operates.

In the LCD device according to the embodiment of the present invention, since the digitizer 140 is disposed between the liquid crystal module 100 and the printed circuit board 111 using the installation unit 150, interference from electromagnetic waves of the printed circuit board 111 is prevented. In addition, the printed circuit board 111 is bent toward the rear surface of the liquid crystal module 100, and the bezel size is decreased.

Moreover, a manufacturer can reduce costs for installing the digitizer because the user decides the installation of the digitizer.

In the embodiment, the liquid crystal module is explained as an example of a display device, and other display modules such as organic light-emitting diode display modules can be used as the display device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. A liquid crystal display device, comprising:
   a liquid crystal module;
   a printed circuit board providing driving signals to the liquid crystal module; and
   an installation unit directly attached to a rear surface of the liquid crystal module, the installation unit including first, second and third parts, wherein the first part is disposed between the liquid crystal module and the second part, the second part faces the first part and is attached to the printed circuit board, and the third part connects the first and second parts, and wherein a digitizer is installed between the first and second parts and is detachable.

2. The device according to claim 1, wherein the installation unit has a cross-section of a V-like or U-like shape.

3. The device according to claim 1, wherein the installation unit includes a material selected from polyethersulfone (PES), polycarbonate (PC), polyimide (PI), polyethylene terephthalate (PET), polyethylene naphthalate (PEN), poly acrylate (PAR) and fiber reinforced plastic (FRP).

4. The device according to claim 1, wherein a double-sided tape is attached between the first part and the liquid crystal module and between the second part and the printed circuit board.

5. The device according to claim 1, further comprising a cover shield covering an outer surface of the printed circuit board.

6. The device according to claim 5, wherein the cover shield includes a first cover shield side corresponding to integrated circuits of the printed circuit board and a second cover shield side both sides of the first cover shield side, wherein the first cover shield side is attached to an insulating tape, and the second cover shield side is attached to a conductive tape.

7. The device according to claim 1, wherein the liquid crystal module includes:

a cover bottom;

a backlight unit and a liquid crystal panel sequentially disposed inside the cover bottom;

a guide panel disposed between the backlight unit and the liquid crystal panel to support the liquid crystal panel and combined with sides of the cover bottom; and a case top fixing the guide panel and the liquid crystal panel.

8. The device according to claim 7, wherein the installation unit is attached to an outer surface of the cover bottom.

9. A liquid crystal display device, comprising:

a liquid crystal module;

a printed circuit board to provide driving signals to the liquid crystal module;

a digitizer electrically connected to the printed circuit board to recognize a coordinate of the liquid crystal display device; and an installation unit directly attached to a rear surface of the liquid crystal module, the installation unit including first, second and third parts, wherein the first part is disposed between the liquid crystal module and the second part, the second part faces the first part and is attached to the printed circuit board, and the third part connects the first and second parts, and wherein the digitizer is attached to the first part of the installation unit and is detachable.

10. The device according to claim 9, wherein the installation unit has a cross-section of a V-like or U-like shape.

11. The device according to claim 9, wherein the installation unit includes a material selected from polyethersulfone (PES), polycarbonate (PC), polyimide (PI), polyethylene terephthalate (PET), polyethylene naphthalate (PEN), poly acrylate (PAR) and fiber reinforced plastic (FRP).

12. The device according to claim 9, wherein a double-sided tape is attached between the first part and the liquid crystal module and between the second part and the printed circuit board.

* * * * *